United States Patent [19]

Burleigh et al.

[11] Patent Number: 4,644,024

[45] Date of Patent: Feb. 17, 1987

[54] PENTADIENYL CHLORIDE DERIVED POLYMERS

[75] Inventors: John Burleigh; Carl A. Uraneck, both of Bartlesville, Okla.

[73] Assignee: Phillips Petroleum Company, Bartlesville, Okla.

[21] Appl. No.: 443,721

[22] Filed: Nov. 22, 1982

[51] Int. Cl.$^4$ .................... C08F 126/06; C08L 27/00; C08K 5/34
[52] U.S. Cl. .................................. 524/99; 524/243; 524/249; 524/251; 524/257; 524/552; 525/330.8; 525/330.9; 525/215; 526/263; 526/258; 526/265; 526/295
[58] Field of Search ............... 526/295, 263, 265, 258; 525/330.8, 330.9, 215; 524/552, 99, 243, 249, 251, 257

[56] References Cited

U.S. PATENT DOCUMENTS

| | | | |
|---|---|---|---|
| 3,494,965 | 2/1970 | Jones et al. | 526/295 |
| 4,085,263 | 4/1978 | Otsuki | 525/360 |

Primary Examiner—Edward J. Smith
Assistant Examiner—Peter F. Kulkosky
Attorney, Agent, or Firm—French and Doescher

[57] ABSTRACT

Polymers containing repeat units based on substituted or unsubstituted pentadienyl chloride monomers are disclosed. The polymers are fast curing and some of the polymers are self-curing.

23 Claims, No Drawings

PENTADIENYL CHLORIDE DERIVED POLYMERS

This invention relates to polymers having repeat units that are at least in part derived from unsubstituted or substituted pentadienyl chlorides. In another aspect this invention relates to a process to produce such polymers. In a further aspect, this invention relates to self-curing formulations containing such polymers, and particularly to adhesive formulations.

BACKGROUND OF THE INVENTION

Synthetic rubber production is a well developed and mature area of technology. Homopolymerization and copolymerization of alkadienes has resulted in a large variety of rubbery products and also resinous products. The curing characteristics of such materials are of significant importance for their commercial application. Controlling and manipulating the curing speed and curing efficiency is a constant goal in the industry.

THE INVENTION

It is one object of this invention to provide novel copolymers having desirable properties.

Another object of this invention is to provide polymers and copolymers which can be cured at a high rate.

Still another object of this invention is to provide novel polymers and copolymers which are essentially gel free before curing.

Yet another object of this invention is to provide a process for producing gel free polymers and copolymers which can be rapidly cured.

A still further object of this invention is to provide self-curing formulations, and particularly adhesives.

These and other object, advantages, details, features and embodiments of this invention will become apparent to those skilled in the art from the following description of the invention and the appended claims.

In accordance with this invention, novel homopolymers and copolymers are provided which contain a substantial amount of repeat units derived from substituted or unsubstituted pentadienyl chloride having the formula

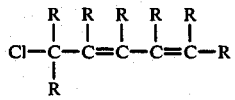

wherein R is hydrogen or an alkyl radical of 1–15 carbon atoms. These compounds in the following also will be referred to as "chlorodiene".

Polymers

In accordance with a first embodiment this invention relates to pentadienyl chloride polymers. Pentadienyl chlorides are defined above. The polymers of this invention contain repeat units derived from pentadienyl chlorides in a substantial amount, i.e. in a quantity that has a significant, measurable influence on the properties of the polymer. Preferably the repeat units derived from the pentadienyl chlorides are present in the polymers of this invention in a quantity of at least 2 parts by weight per 100 parts by weight of total monomers (phm), and most preferably in a quantity of at least 5 phm.

The repeat units of the polymers of this invention derived from pentadienyl chloride are expected to have one of the following structural formulae A, B and C.

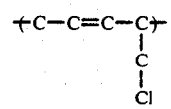

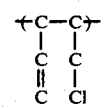

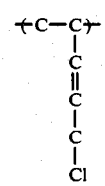

with the understanding that the remaining valences of the carbon atoms shown in these structural units that are not connected to neighboring repeat units are connected to moieties which can be the same or different selected from the group consisting of hydrogen and alkyl having 1 to 15 carbon atoms. Presently preferred are those polymers wherein the moieties mentioned are hydrogen.

The polymers of this invention have molecular weights which can vary in broad ranges. Generally speaking, the number average molecular weight of the polymers here involved will be in the range of about 500 to about 2 million as determined by light scattering and/or osmometry.

The polymers of this invention can be homopolymers of pentadienyl chloride or copolymers containing both the repeat units defined above and a substantial amount of further repeat units derived from one or more of the monomers that are copolymerizable with the pentadienyl chloride. While the preferred pentadienyl chloride is 1-chloro-2,4-pentadiene other pentadienyl chlorides are also useful in accordance with this invention as monomers from which the respective repeat units in the polymer are derived. Examples of such other pentadienyl chloride monomers are 1-chloro-3-methyl-2,4-pentadiene; 1-chloro-2-methyl-2,4pentadiene; 1-chloro-2,4-hexadiene; 1-chloro-3-pentadecyl-2,4-pentadiene and the like.

Among the comonomers from which the further repeat units in the copolymers in this invention are derived, the following constitute a preferred group:

Conjugated dienes of 4–12 carbon atoms per molecule. Examples include 1,3-butadiene (preferred); isoprene; chloroprene; piperylene; 2,3-dimethyl-1,3-butadiene; 5,6-diethyl-1,3-octadiene and the like.

Vinyl-substituted aromatic compounds of 8–20 carbon atoms per molecule. Examples include styrene (preferred); p-methylstyrene; 4-chlorostyrene; 2,3-dichlorostyrene; p-methoxystyrene; p-dodecylstyrene and the like.

Ethylenically unsaturated nitriles having 3–8 carbon atoms per molecule. Examples include acrylonitrile, methacrylonitrile and the like.

Esters of acrylic or methacrylic acid having 4–8 carbon atoms. Examples include ethyl acrylate, methyl methacrylate and the like.

Vinyl esters having 3–8 carbon atoms. Examples include vinyl acetate, vinyl propionate and the like.

Vinyl ketones having 4–8 carbon atoms. Examples include methyl vinyl ketone, butyl vinyl ketone and the like.

Vinyl substituted amino functional compounds having 8–20 carbon atoms per molecule. The amino functional group is preferably one where the nitrogen is attached to carbon atoms and has no hydrogens attached; an example is a dialkyl amino group. Examples of such compounds indlude:

(a) vinyl substituted heterocyclic compounds such as
vinylpyridines, e.g. 2-vinylpyridine, 4-vinylpyridine, 2-methyl-5-vinylpyridine
vinyl pyrrolidones, e.g. 3-dimethylamino-vinylpyrolidone, 1-vinyl-5-dimethylamino pyrrolidone
vinyl pyrroles, e.g. 1-vinyl pyrrole
vinyl pyrrolidine, e.g. 2-vinylpyrrolidine
(b) acrylamides having 3–16 carbon atoms, e.g. dimethylaminoethylacrylamide
(c) aminoalkyl esters of acrylic acid and methacrylic acid having 4–16 carbon atoms, e.g. dimethylaminoethyl methacrylate, aminomethyl methacrylate
(d) aminostyrenes having 10–20 carbon atoms, such as p-dimethylaminostyrene and the like.

Among the vinyl substituted amino functional compounds having 8–20 carbon atoms the following are particularly preferred as monomers or comonomers in self-curing compositions as outlined below:
vinylpyridines, vinylpyrroles, aminoalkyl acrylates, aminoalkyl methacrylates, aminostyrenes. Specific examples for these groups of monomers are cited above.

Two or more of the copolymerizable monomers can be employed in forming the copolymers together with the pentadienyl chloride monomers in accordance with this invention.

Since the polymers of this invention can range from resinous to rubbery as described above, they can be employed in a wide variety of applications. For instance, they can be used in making film, molded containers, tubing, pipe, tires, belts, motor mounts, hose, gaskets and the like. They can be used in sealants, mastics, adhesive compositions, asphalt paving mixes and the like. They also can be blended with other polymers for use in the above applications.

Incorporating about 2–5 phm of pentadienyl chloride monomer in the polymerization mixture for a nitrile rubber (e.g. a polymerization mixture containing butadiene and acrylonitrile) will result in a polymer having a high curing rate and when cured will constitute a hydrocarbon resistant material particularly useful for instance in gaskets. A further specific utility of the polymers of this invention exists when the polymer contains both the halogen function and an amine function. Such polymers are self-curing and when prepared as a solution, such a solution can be used both for coating applications and in adhesives.

Polymerization Process

In accordance with a further embodiment of this invention, a polymerization process for producing the polymers of this invention is provided. In this process, pentadienyl chloride monomer, as defined above, is subjected to polymerization conditions and the polymer thereby produced is recovered. One or more of the pentadienyl chloride monomers can be used in the process of this invention. Similarly, if copolymers, as defined above, are to be produced the respective monomers which provide the further repeat units in the polymer chain are copolymerized with the pentadienyl chloride under the polymerization conditions.

The chlorodiene homopolymers or copolymers of this invention are preferably prepared under free radical polymerization conditions. The free radical polymerization can be conducted under solution polymerization conditions or aqueous emulsion polymerization conditions.

Typical solvents for use in the free radical solution polymerization process include benzene, toluene, cyclohexane, n-heptane, and the like. It is recognized by those skilled in the art that solvents in free radical solution polymerization systems are generally not inert under polymerization conditions but can be involved in chain transfer reactions and the like. Thus, one should exercise judgement in selecting a suitable solvent for use with a particular combination of free radical initiator, monomer(s), temperature, concentration and the like. Temperature and pressure are selected to keep the solvent and monomers in the liquid state preventing substantial evaporation.

Typical free radical initiators for use in solution polymerization systems include the azo compounds, especially the azo-nitriles, and organic peroxides of various types. Examples of suitable specific initiators include 2,2'-azo-bis-isobutyronitrile (AIBN), 1,1'-azo-bis-1-cycloheptanenitrile, methyl ethyl ketone peroxide, benzoyl peroxide, di-t-butyl peroxide, t-butyl perbenzoate, cumene hydroperoxide, cyclohexylbenzene hydroperoxide, p-menthane hydroperoxide, and the like, and mixtures thereof.

It is also possible to use radiation of sufficient energy to cause polymerization of the monomers described above. Ultraviolet radiation sources employed with suitable sensitizer compounds can be used to promote polymerization. Gamma radiation from sources such as Co6O can also be used to promote polymerization.

The other process employed in preparing the polymers of the invention is generally termed an emulsion polymerization process. The term "emulsion polymerization" as used herein is to be construed as polymerization under aqueous emulsion conditions in its broadest sense, that is, denoting the presence of an aqueous phase and an oil phase (monomer optionally with diluent) without regard to the extent of dispersion one into the other, or of which is the continuous or discontinuous phase. Most usually, emulsion polymerizations of the monomers described are carried out in aqueous dispersion, wherein the aqueous phase is the continuous phase, the monomers as the discontinuous phase are dispersed therein, with the aid of dispersing or emulsifying agents, and agitation, as necessary.

Because the chlorodiene monomer unit (combined in the polymer or free) can undergo hydrolysis with the resulting loss of the chlorine, it is preferred that the pH of the emulsion polymerization system be near 7 such as from about 6 to about 8. It is expected that temperature will have an effect on the hydrolysis reaction so that more latitude in the pH could be observed at low polymerization temperatures rather than at higher temperatures.

In view of the preferred pH condition described above, the type and amount of emusifier should be selected accordingly. Alkyl aryl sulfonates and mixtures with commonly used dispersing agents are particularly effective. Nonionic emulsifiers also can be employed including polyethyers and polyols.

Amounts of emulsifying agent employed depend on the type selected and other reaction parameters and monomer concentrations. An expedient range would be about 0.5 to 10 phm, parts by weight per 100 parts of total monomer. The relative amounts of emulsifier:-modifier can range widely depending on monomers, species, reaction parameters, degree of modification desired and the like. An expedient range would be about 250:1 to 1:1 weight ratio of emulsifier:modifier, although operability outside this range is feasible.

Aqueous medium normally is employed with the emulsifier, though other components such as one or more of the lower alcohols or glycols may be added for lower temperature polymerizations when desired. The amount of water or water and alcohol or a glycol employed is a matter of convenience as to amount of materials to handle and is not limiting as far as making the coagitated admixture of emulsifier:modifier is concerned. Supplemental water for the emulsion polymerization process itself can be readily later added at that stage.

It is generally preferred that the emulsion be of the oil in water type, employing a ratio of aqueous medium to monomeric material between about 0.15:1 and about 9:1 parts by weight, preferably between about 1:1 and about 2:1.

Free radical initiators useful in the emulsion polymerization according to the invention include any of the broad groups of compounds utilized for the purpose in aqueous emulsion polymerization systems. Such initiators include the redox system such as ferrous sulfate/-hydrogen peroxide, potassium persulfate/sodium bisulfite, and the like. Such free radical initiators also include the monomer-soluble, or sometimes termed oil-soluble, organoperoxides, organohydroperoxides, and azo compounds. Amounts of initiator employed are exemplarily in the range of about 0.01 to 5 phm, more preferred about 0.03 to 1 phm because it provides desirable conversion and polymer properties.

Exemplary catalysts useful in the process of this invention include di-t-butylperoxide, benzoyl peroxide, lauroyl peroxide, t-butylperacetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azo-bis-isobutyronitrile, and the like, and mixtures thereof.

Generally incorporated in emulsion polymerization systems are molecular weight modifiers, particularly of the organo-sulfur type, including the dialkyl dixanthogens, diaryl disulfides, tetraalkylthiuram mono- and disulfides, mercaptothiazoles, hydrocarbyl mercaptans, and the like. Most preferred at present are the mercaptan compounds, and of these presently are preferred the hydrocarbyl mercaptans containing 8 to 20 carbon atoms per molecule, with hydrocarbyl groups selected from alkyl, including primary, secondary, tertiary, cycloalkyl, cycloalkenyl, cycloalkadienyl, aryl, and combinations. Presently preferred are the tertiary alkyl mercaptan modifiers.

Exemplary organosulfur modifiers include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan, aryl mercaptans such as 1-naphthalenethiol, and the like, bis(tetrahydrofurfural xanthogen), diphenyl disulfide, tetramethyl thiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixture of commercial t-dodecyl, t-tetradecyl, and t-hexadecyl mercaptans.

The amount of organosulfur modifier employed can vary widely, as is known in the art, depending on particular compounds or mixtures chosen, as well as polymerization temperatures, emulsifier and other recipe factors and ingredients, and the extent of modification desired. Exemplary amounts are about 0.01 to 5 phm organosulfur compound with about 0.05 to 2 phm presently being preferred, because in combination with other polymerization parameters it produces desirable results. It appears that the chlorodiene monomers are rather active as chain transfer agents so that less of the conventional organosulfur modifier is needed to achieve a target molecular weight. One skilled in the art can determine the proper modifier level to be employed by a few experiments as is conventional practice in the emulsion polymerization art.

After the degree or extent of polymerization desired has been accomplished, the polymerization reaction can be terminated with a shortstop. An antioxidant also usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment. In the typical recovery operations employed, care should be exercised to avoid conditions of high pH and elevated temperature which would promote hydrolysis of the chlorine-containing moiety in the polymer.

The temperature employed in the polymerization of the chlorodiene monomers and comonomers, if present, whether in a solution or emulsion polymerization system can be in the range from about $-20°$ C. to about $60°$ C. and preferably from about $-10°$ C. to about $20°$ C.

Curable Composition

Still another embodiment of this invention resides in a curable composition. This composition contains a polymer as defined above as well as a modifying agent. Such a modifying agent can either be a curing agent or a crosslinking agent or mixtures of such materials. A modifying agent in this application is intended to cover compositions added to the polymer in a quantity sufficient to change the molecular structure of the polymer to a substantial and measurable degree by connecting sections of the polymer macromolecule in such a way that such connections cannot be broken by regular, normal solvents for the polymer. Curing agents that can be employed in the composition of this invention can be the widely known curing agents that are used for alkadiene based rubbers. Other modifying agents which can be used alone or in addition to curing agents are chemical compounds capable of forming a bond or connection with the halogen containing moieties of the polymer molecule. Particularly noteworthy are amine compounds which are capable of a quaternization reaction with the carbon-halogen moieties of the polymer molecule. Examples of curing agents can be found in U.S.

Pat. No. 2,582,795. The disclosure of the curing agents of this patent is herewith incorporated by reference. The preferred curing agents, when used in accordance with this invention, are sulfur based curing agents, and in particular elemental sulfur with zinc oxide and various vulcanization agents such as tetramethylthiuram disulfide or N-cyclohexyl-2-benzo-thiazolesulfenamide, xanthates, and the like. Amine based modifying agents can be used. Particularly preferred amine based modifying agents are pyridine, triethylenediamine, triethanolamine, quinoline and N,N-dimethylaniline.

The modifying agent is generally employed in the composition of this invention in a quantity of 0.01 to 1.0 mole, preferably 0.1 to 1.0 per mole of chloride in the polymer.

Depending on the types and quantity of repeat units derived from monomers other than the chlorodiene monomer the polymer product can range from thermoplastic resins to elastomeric products. These materials can be compounded with conventional fillers and reinforcing agents, plasticizers and extender oils, pigments and colorants, antioxidants and thermal stailzers, curing and crosslinking agents and the like. Typical curing systems based on sulfur or a sulfur source and accelerators are especially useful. Because of the presence of halogen (e.g. chlorine) from the chlorodiene monomer incorporation, the polymer products are also amenable to curing or modification by reactions involving the chlorine substituents. The reaction of tertiary amine compounds is especially useful in this regard in that a salt like moiety can form through a quaternization reaction. This reaction can be employed in addition to the sulfur-based crosslinking by simply adding suitable tertiary amines to the sulfur-based curing system.

Process to Produce Shaped Articles

Yet another embodiment of this invention resides in a process to produce shaped articles from polymer compositions in accordance with this invention. Curable compositions as defined above in this process are introduced into a mold and these compositions are subjected to curing conditions. The mold filled with a quantity of the composition defined above can, for instance, be heated so that the mold and its contents reach the activation temperature for the modifying agent or curing agent and this temperature can then be maintained for the time necessary to achieve the desired modification or curing of the composition. Thereafter, the mold is cooled and the shaped article is removed from the mold. Another possibility under this invention process to form or shape an article from the polymers of this invention resides in extruding a given quantity of the compound through a die. Since the general step involved in the shaping or extruding process of this invention are old in the art, a further detailed description of these steps can be avoided. The shaping process is modified by the use of the polymers of this invention in that the presence of the chlorodiene derived repeat units in the polymer chain change the curing characteristics and generally increase the curing speed.

Self-Curing Composition

It has been found that the chlorodiene derived repeat units in the polymers defined above exhibit the ability of self-curing when the polymer composition also contains a substantial amount of repeat units comprising a nitrogen atom capable of quaternization.

Thus in accordance with a still further embodiment of this invention a composition is provided that is at least partially self-curing. This composition comprises polymer molecules having first repeat units derived from pentadienyl chloride and having second repeat units derived from amino functional vinyl monomers. The first and second repeat units may be present in one and the same polymer molecule and/or in separate polymer molecules.

Thus, in accordance with a first variation of this embodiment of this invention, a self-curing composition is provided which contains a polymer containing substantial quantities of each of the two kinds of repeat units mentioned above.

In addition to having the two kinds of repeat units, i.e. the pentadienyl chloride derived unit and the amino functional unit capable of quaternization present in one polymer molecule, these units can also be present in different polymer molecules. Thus, in a further variation of this embodiment of the invention, the self-curing composition contains a first polymer having pentadienyl chloride derived repeat units and a second polymer having repeat units derived from one or more vinyl substituted amino functional monomers, which repeat units are capable of complexing or quaternizing with the pentadienyl chloride derived units. The relative quantities of the first and second polymer can vary widely; while employing the polymers in relative quantities such that the number of pentadienyl chloride derived moieties and that of the quaternizable amino functional repeat units are roughly equal makes efficient use of the self-curing moieties, it is within the scope of this invention to employ the first or the second polymer in relative quantities where either the chloride units or the amino functional units are present in substantial excess. Thus, a small quantity of one of the polymers can be employed to provide the blend with enhanced green strength and improve handling of the blend particularly in connection with molding and curing operations.

The self-curing compositions of this invention will generally contain the pentadienyl chloride derived moieties and the amino functional moieties in a molar ratio in the range of 1:50 to 50:1, preferably in the range of 1:20 to 50:1.

The self-curing effect observed is believed to result from a quaternization reaction between the nitrogen in the polymer and the carbon-chlorine moiety in the polymer. In order to avoid premature self-curing it is presently preferred that the self-curing composition contains the polymer(s) in diluted form or in solution. Solvents for this purpose include the following:

Pyridine, N,N-dimethylaniline, triethanolamine, dimethylaminoethyl methyl ether, triethylamine, tripropylamine, and the like.

Adhesive

The above-identified self-curing composition is particularly useful in connection with adhesive applications. A yet further embodiment of this invention thus resides in an adhesive which contains the self-curing polymer. Most preferably, the adhesive of this invention contains the following ingredients in the quantity ranges listed.

|  | Parts by Weight |
|---|---|
| Self-Curing polymer composition | 100 |
| Solvent | 400–4,000 |

-continued

| | Parts by Weight |
|---|---|
| Tackifier (optional) | 0–300 |

Examples of optional tackifiers useful in the adhesives of this invention include rosin acid esters, polybutenes, polyterpene resins, coumaroneindene resins, thermoplastic phenolic resins, and the like.

The adhesives in accordance with this invention are preferably used in a similar fashion as hot-melt adhesives. The self-curing is effected by heating the materials to be bonded with the adhesive between them to a temperature where the solvent and/or diluent evaporates and where the self-curing reactions take place.

The following examples are provided to further illustrate the invention and preferred embodiments thereof but are not intended to unduly limit its scope.

The 1-chloro-2,4-pentadiene used in the polymerization runs was prepared by reaction of concentrated hydrochloric acid with 1,4-pentadien-3-ol. The purity of the chlorodiene ranged from 98.5–99.6% as determined by gas-liquid chromatography with the principal impurity being 0.4–1.2% of the starting material, 1,4-pentadien-3-ol.

EXAMPLE I

Preliminary experiments were carried out for the copolymerization of 1,3-butadiene/1-chloro-2,4-pentadiene (80/20 weight ratio) under emulsion polymerization conditions at 5° C. using an alkylaryl sulfonate emulsifier. Table I summarizes the results obtained in these recipe development runs.

TABLE I

| Run No. | Initiator System(s) | Conversion % in hr. |
|---|---|---|
| 1 | Variable SFS[a]-PMH[b] | 2–3 in 15 |
| 2 | FePP[c]-PMH | 31 in 20 |
| 3 | Variable FePP-PMH | 42–63 in 4.8[d] |
| 4 | FePP-CHBHP[e] | 51 in 3.7 |
| 5 | Variable FePP-PMHP | 19–31 in 6.4 |
| 6 | FePP-CHBHP[d] | 55 in 4.8 |

[a]SFS, sodium formaldehyde sulfoxylate
[b]PMH, p-menthane hydroperoxide
[c]FePP, ferrous pyrophosphate
[d]Initiator booster used
[e]CHBHP, cyclohexylbenzene hydroperoxide Runs 3, 4 and 6 pointed the way to a convenient 5° C. emulsion polymerization system as shown in Table II.

TABLE II

| A. | Recipe | Parts by weight |
|---|---|---|
| | 1,3-Butadiene | 80 |
| | 1,-Chloro-2,4-pentadiene | 20 |
| | Water | 212 |
| | Santomerse 85[a] | 2.5 |
| | Daxad 17[b] | 0.2 |
| | tert-Dodecyl mercaptan | 0.2 |
| | Initiator | variable |

| B. | Results | | | | |
|---|---|---|---|---|---|
| | Run No. | PMH, mhm | CHBHP, mhm | FePP, mhm | Conversion % @ 2.8 hr. |
| | 1 | 1.1 | — | 1.1 | 26 |
| | 2 | — | 1.1 | 1.1 | 34 |
| | 3 | — | 2.2 | 2.0 | 60 |

[a]Dodecylbenzene sodium sulfonate, 85% active ingredient, Monsanto Chemical Co.
[b]Sodium salts of polymerized alkyl naphthalene sulfonic acids, W. R. Grace Co.

Other runs were conducted employing variable levels of mercaptan in the recipe of Run No. 3 of Table II. The results from these runs are shown in Table III below.

TABLE III

| Run No. | Mercaptan phm | Conv. % @ 2.7 hr | Gel %[a] | Inherent Viscosity dl/g | Cl. wt. % |
|---|---|---|---|---|---|
| 1 | 0.17 | 60 | 0 | 2.18 | — |
| 2 | 0.21 | 62 | 0 | 1.95 | — |
| 3 | 0.26 | 61 | 0 | 1.69 | 7.8[c] |
| 4 | 0.30 | 61 | 0 | 1.57 | — |

[a]Determined according to U.S. 3,278,508, col. 20, note b.
[b]Determined according to the procedure of U.S. 3,278,508, col. 20, note a with the modification that tetrahydrofuran (THF) is used in place of toluene and that the solution was not filtered through a sulfur absorption tube but rather a sample of the solution was filtered through a fritted glass filter stick of grade C porosity and pressured directly into the viscometer.
[c]Chlorine content indicates combined 1-chloro-2,4-pentadiene of 22.7% by weight. Heterogeneity index (HI), Mw/Mn, determined by Gel Permeation Chromatography was 4.4 for this polymer.

A typical charge procedure for the runs of Tables II and III involved the following steps. Emulsifier solution (aqueous) was prepared using boiled water and was charged to the beverage bottle reactor first. Mercaptan solution in benzene (1 mL mercaptan diluted to 10 mL in benzene) was charged next, butadiene was then added and the bottle capped with a crown cap having holes and a self-sealing rubber liner. The capped bottle reactor was placed in a 5° C. constant temperature bath equipped with a paddle wheel means to agitate the bottle contents. After the contents were at about 5° C., cyclohexylbenzene hydroperoxide (9.1% active ingredient) was charged followed by the 1-chloro-2,4-pentadiene monomer. Finally, the proper amount of ferrous pyrophosphate formed (1 hr. @ 60° C.) from $FeSO_4 \cdot 7H_2O$ (1.40 g) and $Na_4P_2O_7 \cdot 10H_2O$ (2.23 g) in 100 mL $H_2O$ was charged and the bottle returned to the 5° C. constant temperature bath.

Monomer conversion to polymer was followed during the run by conventional sampling techniques and determination of the polymer solids content of the sample.

The polymerization reaction was shortstopped with aqueous di-tert-butyl-hydroquinone (DTBHQ) (b 0.4 phm) and then the polymer precipitated by discharging the bottle reactor contents into 400 mL of 2-propanol containing sufficient antioxidant Flexzone 7L (which is N-1,3-dimethylbutyl-N'-phenyl-p-phenylenediamine) to provide 0.3 phm. The precipitated polymer was rinsed with 2-propanol then dried in a vacuum oven for about 14 hours at 60° C.

EXAMPLE II

A polymerization of 1,3-butadiene/2-chloromethyl-1,3-butadiene (80/20) was conducted using the recipe and charge order shown below.

| Recipe | Parts, by weight |
|---|---|
| 1,3-Butadiene | 80 |
| 2-Chloromethyl-1,3-butadiene | 20 |
| Water | 180 |
| Santomerse 85 | 2.5 |
| Questex 4SW[a] | 0.064 |
| $FeSO_4 \cdot 7H_2O$ | 0.020 |
| $NaSO_2CH_2OH \cdot 2H_2O$ (SFS) | 0.075 |
| PMHP | 0.095 |
| tert-Dodecyl mercaptan | 0.30 |

-continued

| Recipe | |
|---|---|
| | Parts, by weight |
| Temperature, °C. | 5 |

(a)Tetrasodium salt of ethylenediamine tetraacetic acid .4H₂O
Charge Order: Emulsifier solution, 2-chloromethyl-1,3-butadiene, mercaptan, 1,3-butadiene, PMHP, cool to 5° C., activator solution (Questex 4SW, FeSO₄.7H₂O, SFS).

The reaction was boosted with additional PMHP and activator at about 10 hours. The reaction was shortstopped with DTBHQ at 25.1 hours at about 55% conversion to polymer. The mixture was coagulated in 2-propanol containing additional DTBHQ as antioxidant, the polymer was washed with water and then 2-propanol. The polymer was dissolved in benzene and reprecipitated with 2-propanol containing 1% DTBHQ and then dried at 60° C. under vacuum.

The above polymer contained 10% chlorine by weight indicating 28.9% combined 2-chloromethyl-1,3-butadiene. Inherent viscosity was 1.28 but the polymer contained 46% gel. This result is to be contrasted with the gel-free polymers in Table III of Example I and indicates a sensitivity to unwanted crosslinking under rather mild conditions when the monomer is 2-chloromethyl-1,3-butadiene.

EXAMPLE III

Additional polymerization runs were carried out at 5° C. using a monomer mixture of 1,3-butadiene/-styrene/1-chloro-2,4-pentadiene (70/20/10) to observe the effects of high conversion level or low mercaptan levels on gel content and inherent viscosity/Mooney viscosity. The recipe employed in these runs in shown below and the results obtained are shown in Table IV.

| Recipe | |
|---|---|
| | Parts, by weight |
| 1,3-Butadiene | 70 |
| Styrene | 20 |
| 1-Chloro-2,4-pentadiene | 10 |
| Santomerse 85 | 2.5 |
| Daxad 17 | 0.20 |
| KOH | 0.40 |
| KH₂PO₄ | 1.2 |
| Water | 210 |
| tert-Dodecyl mercaptan | variable |
| FeSO₄.7H₂O | 0.42 |
| Na₄P₂O₇.10H₂O | 0.67 |
| Cyclohexylbenzene hydroperoxide (CHBHP) | 0.33 |

Charge Order: Buffered emulsifier solution (Santomerse, Daxad, KOH, and KH₂PO₄), styrene, 1,3-butadiene, cool to 5° C. in bath, activator (FeSO₄.7H₂O and Na₄P₂O₇.10H₂O prereacted), CHBHP and finally 1-chloro-2,4-pentadiene, return to 5° C. bath.
Polymer Recovery: Reactions were shortstopped with DTBHQ, diluted with aqueous solution of Flexzone 7L then coagulated with 2-propanol containing 0.2% Flexzone 7L. Polymer was washed three times with deionized water and dried overnight at 60° C. in an air oven.

TABLE IV

| Run No. | Mercaptan phm | Time hr. | Conv. % | Mooney(a) Viscosity | Inherent Viscosity | Gel % |
|---|---|---|---|---|---|---|
| 1 | 0.26 | 5.2 | 65 | 19 | 1.30 | 0 |
| 2 | 0.19 | 4.6 | 57 | 25 | 1.47 | 0 |
| 3 | None | 4.6 | 60 | 163 | 4.15 | 24 |

(a)ML-4 @ 212° F. ASTM D-1646-63

These results indicate that unusually low levels of mercaptan would be required for the production of a 50 Mooney polymer with the recipe utilized and suggest that the 1-chloro-2,4-pentadiene monomer is providing some chain transfer effect in the polymerization.

Other runs were conducted at 5° C. using the recipe below, charging procedures described above and employing 0.14 phm mercaptan or no mercaptan and wherein the runs were sampled to follow inherent viscosity and gel with conversion.

| Recipe | |
|---|---|
| | Parts, by weight |
| 1,3-Butadiene | 70 |
| Styrene | 20 |
| 1-Chloro-2,4-pentadiene | 10 |
| Santomerse 85 | 5.0 |
| Daxad 17 | 0.30 |
| KOH | 0.27 |
| KH₂PO₄ | 0.80 |
| Water | 194 |
| tert-Dodecyl mercaptan | 0 or 0.14 |
| FeSO₄.7H₂O | 0.28 |
| Na₄P₂O₇.10H₂O | 0.45 |
| Cyclohexylbenzene hydroperoxide (CHBHP) | 0.22 |

The results obtained are shown in Table V below.

TABLE V

| Run No. | Time hr. | Conv. % | Inherent Viscosity | Gel % |
|---|---|---|---|---|
| Series A - no mercaptan | | | | |
| 1 | 2.5 | 6 | 2.67 | 2 |
| 2 | 26.8 | 40 | 2.5 | 0 |
| 3 | 27.4 | 50 | 2.99 | 0 |
| 4 | 30 | 65 | 3.22 | 0 |
| Series B - no mercaptan | | | | |
| 1 | 24 | 31 | 1.73 | 0 |
| 2 | 27 | 53 | 2.41 | 0 |
| 3 | 30 | 60 | 2.67 | 0 |
| 4 | 45 | 90 | — | 13 |
| Series C - 0.14 phm mercaptan | | | | |
| 1 | 2.3 | 24 | 1.56 | 0 |
| 2 | 3.3 | 46 | 1.80 | 0 |
| 3 | 4.3 | — | 1.98 | 0 |
| 4 | 5.3 | 70 | 2.10 | 0 |
| 5 | 7.3 | 86 | 2.81 | 0 |

These results show that polymerization in absence of mercaptan is slower than when mercaptan is present but that surprisingly high conversions can be attained without gel formation even in the absence of mercaptan. This again indicates that the 1-chloro-2,4-pentadiene is functioning as a chain transfer agent.

EXAMPLE VI

A larger scale preparation of an 80/20 copolymer of 1,3-butadiene and 1-chloro-2,4-pentadiene was made for compounding evaluation. The polymerization recipe used is shown below and the polymerization results are given in Table VI.

| Recipe | |
|---|---|
| | Parts, by weight |
| 1,3-Butadiene | 80 |
| 1-Chloro-2,4-pentadiene | 20 |
| Santomerse 85 | 2.5 |
| Daxad 17 | 0.20 |
| Water | 200 |
| Cyclohexylbenzene hydroperoxide (CHBHP) | 0.46 |
| Na₄P₂O₇.10H₂O | 0.90 |
| FeSO₄.7H₂O | 0.56 |
| tert-Dodecyl mercaptan | 0.23 |
| Shortstop: DTBHQ | 0.4 |
| Antioxidant: Flexzone 7L | 0.5 |

-continued

| Recipe | |
|---|---|
| | Parts, by weight |
| Temperature, °C. | 5 |

Charge Order: Emulsifier solution, mercaptan, 1,3-butadiene, cool @ 5° C., CHBHP, 1-chloro-2,4-pentadiene, activator (FeP₂O₇) return to 5° C. bath.
Polymer Recovery: Shortstopped, coagulated in 2-propanol containing 0.3% Flexzone 7L, rinsed with 2-propanol, dried in vacuum oven at 60° C.

TABLE VI

| Time hr. | Conv. % | Cl[a] % | Mooney Viscosity | Inherent Viscosity | Gel % | $N_D^{25}$ |
|---|---|---|---|---|---|---|
| 2.2 | 62 | 7.59 | 37 | 1.80[b] | 0[b] | 1.5211[c] |

[a]Indicates 22% combined 1-chloro-2,4-pentadiene.
[b]Determined on polymer sample recovered without antioxidant.
[c]Index of refraction at 25° C.

The above copolymer (Polymer D) was compounded in a Mechanical Rubber Goods (MRG) formulation and a Tread formulation with SBR 1500 (Polymer E) as a control polymer. SBR 1500 is the synthetic rubber industry designation for an emulsion polymerized copolymer of butadiene/styrene (72/28) prepared at 5° C.

| MRG Recipe | |
|---|---|
| | Parts, by weight |
| Polymer | 100 |
| Carbon black[a] | 50 |
| Zinc oxide | 3 |
| Stearic acid | 1 |
| Flexamine[b] | 1 |
| Dioctyl phthalate | 5 |
| Sulfur | 0.25 |
| Altax[c] | 3 |
| Methyl Tuads[d] | 2 |
| Amine additive | variable |

[a]IRB #3 (Type N330) High abrasion furnace black.
[b]Mixture of diarylamine-ketone reaction product (65%) and N,N'—diphenyl-p-phenylenediamine (35%).
[c]2,2'-Dibenzothiazyl disulfide.
[d]Tetramethyl thiuram disulfide.

| Tread Recipe | |
|---|---|
| | Parts, by weight |
| Polymer | 100 |
| Carbon black[a] | 50 |
| Zinc oxide | 3 |
| Stearic acid | 1 |
| Flexamine | 1 |
| Dioctyl phthalate | 5 |
| Sulfur | 1.75 |
| Santocure[b] | 1.2 |

[a]Same as in MRG recipe.
[b]N—Cyclohexyl-2-benzothiazolesulfenamide.

The results from the compounding evaluation are shown in Table VII. These stocks were cured at 188° C. for 45 minutes.

TABLE VII

| | Run No. | | | | | | |
|---|---|---|---|---|---|---|---|
| | 1 | 2 | 3 | 4 | 5 | 6 | 7 |
| Polymer | D | D | D | E | D[a] | D | E |
| Recipe, type | MRG | MRG | MRG | MRG | MRG | Tread | Tread |
| TEA[b], php | 15 | 0 | 0 | 0 | 0 | 0 | 0 |
| TEDA[c], php | 0 | 10 | 0 | 10 | 0 | 0 | 0 |
| Quinoline, php | 0 | 0 | 20 | 0 | 0 | 0 | 0 |
| 300% Modulus[d], MPa | — | 12.5 | — | 5.5 | — | — | 11.3 |
| Tensile[d], MPa | 5.0 | 18.6 | 15.0 | 18.4 | 18.8 | 12.3 | 24.1 |
| Elongation[d], % | 150 | 400 | 190 | 670 | 230 | 105 | 510 |
| ΔT, °C.[e] | 35.2 | 60 | 28.2 | 54.3 | 39.7 | 23.7 | 44 |
| Resilience[f], % | 73.4 | 64.3 | 75.9 | 57 | 64.8 | 80.8 | 60.7 |
| Hardness, Shore A[g] | 61 | 66 | 70.5 | 56.5 | 76 | 77 | 65 |
| Gehman freeze point[h] | −68 | −68 | −68 | −56 | −60 | −66 | −48 |
| Vol. swell[i], % | | | | | | | |
| ASTM #1 | 23 | 13 | 14 | 18 | 12 | 18 | 19 |
| ASTM #2 | 104 | 103 | 79 | 148 | 83 | 76 | 120 |

[a]The polymer in this run was composed of 50 parts of Polymer D and 50 parts of a copolymer of 1,3-butadiene/2-methyl-5-vinylpyridine (75/25).
[b]TEA is triethanolamine
[c]TEDA is triethylenediamine
[d]ASTM D-412-66
[e]ASTM D-623-62
[f]ASTM D-945-59 (modified)
[g]ASTM D-2240-68
[h]ASTM D-1053-61 (modified)
[i]ASTM D-471-66 Using test fluids as indicated.

The results in Runs 1-5 indicate some quaternization is taking place between the chlorine in the polymer and the nitrogen (amino) function in the amino compounds added. Results in Runs 6-7 show that the copolymer of 1-chloro-2,4-pentadiene apparently was significantly overcured under the conditions employed which in turn suggests that 1-chloro-2,4-pentadiene could confer enhanced cure rates in sulfur-based vulcanization systems.

EXAMPLE V

More dramatic evidence for the quaternization reaction was found in the preparation and recovery of a 1,3-butadiene/2-methyl-5-vinylpyridine/1-chloro-2,4-pentadiene (60/20/20) terpolymer. The polymerization recipe is shown below.

| Recipe | |
|---|---|
| | Parts, by weight |
| 1,3-Butadiene | 60 |
| 2-Methyl-5-vinylpyridine (MVP) | 20 |
| 1-Chloro-2,4-pentadiene | 20 |
| Water | 189 |
| Sipon WD[a] | 5.0 |
| KOH | 0.27 |
| KH₂PO₄ | 0.80 |
| FeSO₄.7H₂O | 0.42 |
| Na₄P₂O₇.10H₂O | 0.70 |
| tert-Dodecyl mercaptan | 0.20 |

-continued

| Recipe | Parts, by weight |
|---|---|
| Cyclohexylbenzene hydroperoxide (CHBHP) | 0.33 |
| Shortstop - Thiostop N | 0.80 |
| Antioxidant - Flexzone 7L | 1.0 |
| Temperature, °C. | 5 |

(a)Sodium lauryl sulfate, 98% active, Alcolac, Inc.
Charge Order: Buffered emulsifier solution, MVP, mercaptan, 1,3-butadiene, cool to 5° C. in bath, CHBHP, $FeP_2O_7$ (from prereaction of $FeSO_4.7H_2O$ and $Na_4P_2O_7.10H_2O$), 1-chloro-2,4-pentadiene, return to 5° C. bath.
Polymer Recovery: Added antioxidant solution in aqueous 2-propanol then saturated NaCl (aqueous), coagulated mixture in 2-propanol containing additional antioxidant then polymer dried under vacuum at 60° C.

Upon removal from the vacuum oven the polymer was not millable and contained 95% gel. This result indicates a "self-curing" process which undoubtedly involved a quaternization reaction between the chlorine and pyridine moieties.

EXAMPLE VI

Other terpolymers of 1,3-butadiene/styrene/1-chloro-2,4-pentadiene (70/20/10) were prepared using the recipe shown in Example III and with variable levels of mercaptan for the purpose of evaluating oil-extended polymers. The shortstop used in these runs was sodium dimethyldithiocarbamate. The oil-extended polymers were prepared by stirring the polymer latex with the proper amount of oil emulsion and then coagulating the latex with $NaCl/H_2SO_4$. The polymers were then washed repeatedly at room temperature and dried at 60° C. overnight in an air oven. The extender oil employed was a highly aromatic oil, type 101 under ASTM D-226-63T. Properties of the polymers made in this series are shown in Table VIII.

TABLE VIII

| Run No. | Mercaptan phm | Time hr. | Conv. % | Oil phr(a) | Inherent Viscosity | Gel % | Mooney Viscosity |
|---|---|---|---|---|---|---|---|
| 1 | 0.05 | 5.7 | 60 | 0 | 2.40 | 0 | 85 |
| 2MB(b) | 0.05 | 5.7(c) | 60(c) | 37.5 | 1.68 | 0 | 32 |
| 3 | 0.13 | 5.7 | 60 | 0 | 1.64 | 0 | 37 |
| 4MB | 0.04 | 6.0 | 61 | 37.5 | 1.77 | 0 | 32 |
| 5 | 0.11 | 6.0 | 62 | 0 | 1.70 | 0 | 37 |
| 6MB | 0 | 6.75 | 61 | 50 | 1.81 | 0 | 27 |

(a)phr = parts by weight per hundred parts by weight of latex solids.
(b)MB refers to the oil-extended masterbatch.
(c)Assumed values since Run 2MB is a duplicate of Run 1.

In the compounding evaluation, the polymers from Runs 3 and 5 (Polymer F) and Runs 2MB (Polymer G) were combined. The polymer from Run 1 was not included in the evaluation. Polymer from Run 6MB is designated Polymer H below. These polymers F, G and H were compared to control polymers SBR 1500, SBR 1712, and SBR 1714 in tire tread recipes. The results are summarized in Table IX.

TABLE IX

| | F | SBR 1500 | G | SBR 1712 | H | SBR 1714 |
|---|---|---|---|---|---|---|
| Polymer | | | | | | |
| MB Mooney, ML-4 | 37 | 56 | 32 | 52 | 27 | 50 |
| Added Oil, phr(a) | 10 | 10 | 7.5 | 7.5 | 0 | 0 |
| Total Oil, phr | 10 | 10 | 45 | 45 | 50 | 50 |
| Carbon black, phr(b) | 50 | 50 | 75 | 75 | 80 | 80 |
| Compound Mooney, ML-4 | 61 | 66 | 53 | 61 | 60 | 67 |
| Santocure, phr | 1.2 | 1.2 | 1.0 | 1.0 | 1.1 | 1.1 |
| Comp. Set, % | 14 | 17 | 10 | 18 | 10 | 15 |
| Cured 30 min. @ 153° C. | | | | | | |
| 300% Modulus, MPa | 21.4 | 11.9 | 14.8 | 9.6 | 16 | 10.3 |
| Tensile, MPa | 21.4 | 25.4 | 19.5 | 20.6 | 19.0 | 21.7 |
| Elongation, % | 290 | 520 | 380 | 540 | 340 | 530 |
| ΔT, °C. | 36.7 | 40.4 | 39.6 | 42.2 | 39.7 | 41.6 |
| Resilience, % | 66.6 | 59.8 | 55.6 | 53.1 | 55.6 | 54.5 |
| Hardness, Shore A | 68 | 62 | 68 | 59 | 66 | 61 |

(a)Oil added on the mill during mixing.
(b)Type N339
(c)ASTM D-395-61 Method B (modified)

These results show characteristics of higher cured stocks for the terpolymers than for the controls. This condition is indicated by high modulus, resilience, and hardness along with low tensile, elongation and heat build-up for the polymers containing 1-chloro-2,4-pentadiene when compared to the butadiene/styrene control polymers.

EXAMPLE VII

Another series of polymers was prepared for compounding evaluation employing low levels of 1-chloro-2,4-pentadiene. These polymers were prepared at 5° C. in an emulsion polymerization system which was essentially the same as that shown in Example IV. Amounts of mercaptan, initiator/activator, and shortstop were varied slightly in order to obtain the desired polymer properties for the series. A control polymer containing no 1-chloro-2,4-pentadiene was also prepared at the same time. These polymers contained about 1 phr antioxidant, Flexzone 7L. Recipe variables and polymer properties are shown in Table X.

TABLE X

| | I (control) | J | K | L |
|---|---|---|---|---|
| Polymer | | | | |
| 1,3-Butadiene | 70 | 68 | 60 | 68 |
| Styrene | 30 | 30 | 30 | 30 |
| 1-Chloro-2,4-pentadiene | 0 | 2 | 10 | 2 |
| Santomerse 85 | 2.5 | 2.5 | 2.5 | 2.5 |
| Daxad 17 | .21 | .21 | .21 | .21 |
| Water | 185 | 202 | 211 | 202 |
| Mercaptan | 0.35 | 0.34 | 0.30 | 0.30 |
| $FeSO_4.7H_2O$ | 0.14 | 0.38 | 0.50 | 0.38 |
| $Na_4P_2O_7.10H_2O$ | 0.22 | 0.60 | 0.80 | 0.60 |
| CHBHP | 0.11 | 0.29 | 0.37 | 0.29 |
| DTBHQ | 0.20 | 0.40 | 0.60 | 0.40 |
| Thiostop N | 0 | 0 | 0.16 | 0 |
| Polymerization Results | | | | |
| Conversion, % | 64 | 70 | 70 | 73 |
| Time, hr. | 2.5 | 2.3 | 1.9 | 1.9 |
| Mooney, ML-4 | 60 | 27 | 46 | 68 |
| Inherent viscosity | 2.03 | 1.47 | 1.80 | 2.20 |
| Gel, % | 0 | 0 | 0 | 0 |

The above polymers plus polymer M, a 20/80 blend of polymers J and L, and SBR 1500 as a control polymer were evaluated in a tread stock recipe shown below.

| Tread Recipe | |
|---|---|
| | Parts, by weight |
| Polymer | 100 |
| Carbon black[a] | 50 |
| Zinc oxide | 3 |
| Stearic acid | 2 |
| Flexamine | 1 |
| Extender oil[b] | 10 |
| Santocure | variable |

[a]IRB #3 (Type N330)
[b]Type 101 under ASTM D-2226-63T

Preliminary curing studies were made in an attempt to determine the levels of accelerator (Santocure) needed to give stocks of nearly the same modulus. Based on these studies the indicated Santocure levels were employed in larger scale evaluations. Results are shown in Table XI.

TABLE XI

| | J | L | M | K | I | SBR 1500 |
|---|---|---|---|---|---|---|
| Polymer | | | | | | |
| Butadiene/Styrene | 68/30 | 68/30 | 68/30 | 60/30 | 70/30 | 72/28 |
| 1-Chloro-2,4-pentadiene | 2 | 2 | 2 | 10 | 0 | 0 |
| Raw Mooney, ML-4 | 27 | 68 | 60 | 46 | 60 | 56 |
| Compound Mooney, ML-4 | 35 | 65 | 60 | 52 | 61 | 43 |
| Cured at 153° C. for 30 minutes | | | | | | |
| Santocure, phr | 1.4 | 1.2 | 1.25 | 0.6 | 1.4 | 1.4 |
| Comp. Set, % | 13.2 | 10.5 | 11.2 | 14.1 | 11.0 | 14.0 |
| 300% Modulus, MPa | 11.4 | 12.4 | 12.5 | 18.8 | 11.9 | 9.7 |
| Tensile, MPa | 25.5 | 27.3 | 26.6 | 24.1 | 24.6 | 26.3 |
| Elongation, % | 530 | 510 | 510 | 360 | 500 | 600 |
| ΔT, °C. | 40.7 | 37.6 | 38.4 | 37.3 | 37.1 | 39.7 |
| Resilience, % | 60.5 | 63.7 | 62.7 | 64.9 | 63.7 | 58.7 |
| Hardness, Shore A | 58 | 60 | 58 | 62 | 59 | 57 |

It can be seen that even at two parts of 1-chloro-2,4-pentadiene, its presence is indicated by the need for lower accelerator levels to achieve modulus values nearly the same as the control polymers. These and previous results show that 1-chloro-2,4-pentadiene has a marked accelerating action on the cure of oil extended, thread stock, and mechanical rubber goods formulations.

EXAMPLE VIII

A copolymer of ethyl acrylate (EA) and 1-chloro-2,4-pentadiene (90/10) was prepared in an emulsion polymerization system and compared to a homopolymer of EA in a compounding evaluation. The polymerization recipe is shown below.

Prior to use in the polymerization runs ethyl acrylate monomer was washed 3 times with 5% NaOH (aqueous), 3 times with 20% NaCl (aqueous), with water until neutral to litmus paper and filtered through filter paper.

| Recipe | |
|---|---|
| | Parts, by weight |
| Ethyl acrylate (EA) | 90 or 100 |
| 1-Chloro-2,4-pentadiene | 10 or 0 |
| Sipon WD | 5.2 |
| KOH | 0.29 |
| $KH_2PO_4$ | 0.83 |
| Water | 223 |
| $FeSO_4.7H_2O$ | 0.42 |
| $Na_4P_2O_7.10H_2O$ | 0.67 |
| CHBHP | 0.33 |
| Shortstop - DTBHQ | 0.48 |
| Antioxidant - Flexzone 7L | 1.0 |
| Temperature, °C. | 5 |

Charge Order: Buffered emulsifier solution, EA, cool to 5° C. in bath, $FeP_2O_7$ (from prereacted $FeSO_4.7H_2O$ and $Na_4P_2O_7.10H_2O$), 1-chloro-2,4-pentadiene if added, CHBHP, return to 5° C. bath.

| | Polymerization Results | |
|---|---|---|
| | Run No. | |
| | 1 | 2 |
| Ethyl acrylate | 100 | 90 |
| 1-Chloro-2,4-pentadiene | 0 | 10 |
| Conversion, % | 100 | 94 |
| Time, hr. | 1.0 | 10.8 |
| Inherent viscosity | 0.49 | 3.12 |
| Gel, % | 0 | 0 |
| Chlorine, % | — | 3.90, 3.82[a] |
| $N_D^{25}$ | 1.4676 | 1.4676 |

[a]Indicates 11.7% combined 1-chloro-2,4-pentadiene.

The above polymers were subjected to a curing evaluation in the recipe shown below using a commercially available EA elastomer, Hycar 4021 (B. F. Goodrich) as the control. It is known that such commercial EA polymers employ a comonomer such as 2-chloroethyl vinyl ether as the vulcanization site. The recipe was one specifically recommended for Hycar 4021. A post curing step is usually required for EA elastomers to obtain optimum vulcanizate properties even with the 2-chloroethyl vinyl ether present.

| Recipe | |
|---|---|
| | Parts, by weight |
| Polymer | 100 |
| Carbon black[a] | 40 |
| Stearic acid | 1 |
| Dyphos[b] | 5 |
| Diak No. 1[c] | 0.75 |

[a]Fast extrusion furnace black, type N550
[b]Dibasic lead phosphite.
[c]Hexamethylenediamine carbamate.

Examination of the three stocks in the post curing regime (24 hr. at 153° C.) indicated that Polymer 2 properties were degraded while Polymer 1 achieved only fair properties and was still soft. Hycar 4021 achieved reasonably good properties as expected. The results are shown in Table XII for 30 minutes cure and post cure at 153° C.

TABLE XII

| | Polymer | | |
|---|---|---|---|
| | 1 | 2 | Hycar 4021 |
| Comp. Set, % | No cure | 7.3 | 1.8 |
| 300% Modulus, MPa | 4.8 | 5.1 | 11.8 |
| Tensile, MPa | 9.9 | 5.6 | 12.0 |
| Elongation, % | 725 | 305 | 300 |
| Resilience, % | No cure | 26.0 | 38.3 |
| Hardness, Shore A | 44 | 77 | 61 |

TABLE XII-continued

| | Polymer | | |
|---|---|---|---|
| | 1 | 2 | Hycar 4021 |
| | 43[a] | 70[a] | 51[a] |

[a]After original curing - not post cured.

The Shore A Hardness of the stocks before and after post curing are indicative that Polymer 2 containing 1-chloro-2,4-pentadiene did not need the post curing step.

EXAMPLE IX

Additional copolymer of ethyl acrylate and 1-chloro-2,4-pentadiene were prepared which contained lower amounts of the chlorodiene monomer. The recipe employed is shown below.

| Recipe | |
|---|---|
| | Parts, by weight |
| Ethyl acrylate (EA) | 95 or 98 |
| 1-Chloro-2,4-pentadiene | 5 or 2 |
| Sipon WD | 5.0 |
| KOH | 0.27 |
| KH$_2$PO$_4$ | 0.80 |
| Water | 214 |
| FeSO$_4$.7H$_2$O | 0.42 |
| Na$_4$P$_2$O$_7$.10H$_2$O | 0.67 |
| CHBHP | 0.30 |
| Shortstop - DTBHQ | 0.24 |
| Temperature, °C. | 5 |

Charge Order: Buffered emulsifier solution, EA, cool to 5° C. in bath, 1-chloro-2,4-pentadiene, FeP$_2$O$_7$ (from prereacted FeSO$_4$.7H$_2$O and Na$_4$P$_2$O$_7$.10H$_2$O), CHBHP, return to 5° C. bath.

Polymer Recovery: Reactions were shortstopped with DTBHQ, diluted with aqueous solution of Flexzone 7L then coagulated with 2-propanol containing 0.2% Flexzone 7L. Polymer was washed three times with deionized water and dried overnight at 60° C. in an air oven.

| Polymerization Results | | |
|---|---|---|
| | Run No. | |
| | 1 | 2 |
| Ethyl acrylate | 95 | 98 |
| 1-Chloro-2,4-pentadiene | 5 | 2 |
| Conversion, % | 100 | 96 |
| Time, hr. | 8.1 | 2 |
| Inherent Viscosity | 4.05 | 4.85 |
| Gel, % | 0 | 0 |
| Chlorine, % | 1.92[a] | 0.67[b] |

[a]Indicates 5.4% combined 1-chloro-2,4-pentadiene.
[b]Indicates 1.9% combined 1-chloro-2,4-pentadiene.

These polymers with Hycar 4021 (see Example VIII) were compounded and cured in the recipe shown below and properties determined after an original cure of 30 minutes at 153° C. and then after a post cure step, 24 hours at 149° C.

| Recipe | |
|---|---|
| | Parts, by weight |
| Polymer | 100 |
| Carbon black | 40 |
| Stearic acid | 1 |
| Dyphos | 3 |
| Diak No. 1 | 0.75 |

TABLE XIII

| | Polymer | | |
|---|---|---|---|
| | Run 1 | Run 2 | Hycar 4021 |
| Original Cure | | | |
| Comp. Set, %[a] | 54 | 70 | 63 |
| 200% Modulus, MPa | 6.2 | 4.1 | 3.4 |
| 300% Modulus, MPa | 8.1 | 6.5 | 6.1 |
| Tensile, MPa | 9.5 | 10.9 | 11.8 |
| Elongation, % | 505 | 585 | 595 |
| Hardness, Shore A[a] | 65 | 57 | 56 |
| Post Cured | | | |
| Comp. Set, %[a] | 17 | 12 | 7 |
| 200% Modulus, MPa | 5.0 | 3.7 | 5.8 |
| 300% Modulus, MPa | 7.0 | 6.8 | 9.8 |
| Tensile, MPa | 8.4 | 11.4 | 12.4 |
| Elongation, % | 510 | 560 | 380 |
| Hardness, Shore A[a] | 69 | 61 | 63 |

[a]45 minute cure
[b]The tensile test strips were formed into loops after tensile strengths were measured and placed in an ozone chamber (50 ppm by volume). After 40 days no ozone cracking was found for any of the samples.

Results for compression set, modulus, elongation, and hardness indicate that Polymer 1 (95/5, EA/1-chloro-2,4-pentadiene) is at a higher state of original cure than Hycar 4021. Post curing improved the properties of Hycar 4021 as expected but worsened the properties for Polymer 1. Properties of Polymer 2 were about the same after the original cure and post cure.

Reasonable variations and modifications which will become apparent to those skilled in the art can be made in this invention without departing from the spirit and scope thereof.

We claim:

1. A pentadienyl chloride polymer containing repeat units derived from 1-chloro-2,4-pentadiene.

2. A pentadienyl chloride polymer in accordance with claim 1 characterized by containing a substantial number of one or more of the repeat units A, B and C in the polymer molecule, said repeat units being characterized by the formulae:

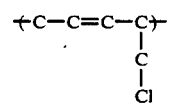 A

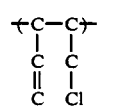 B

 C wherein the remaining valences of the carbon atoms which are not tied to neighboring repeat units are connected to hydrogen.

3. A polymer comprising a substantial amount of units derived from substituted or unsubstituted pentadienyl chloride in the polymer molecule, said pentadienyl chloride having the formula

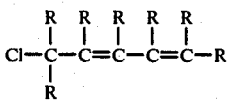

wherein R is hydrogen or an alkyl radical of 1-15 carbon atoms.

4. The polymer of claim 3 characterized by being a copolymer having in addition to the repeat units derived from substituted or unsubstituted pentadienyl chloride a substantial amount of further repeat units derived from one or more monomers selected from the group consisting of conjugated alkadienes having 4-12 carbon atoms per molecule,
vinyl substituted aromatic compounds having 8-20 carbon atoms per molecule,
ethylenically unsaturated nitriles having 3-8 carbon atoms per molecule,
esters of acrylic and methacrylic acid having 4-9 carbon atoms,
vinyl esters of aliphatic and aromatic acids having 3-8 carbon atoms,
vinyl ketones having 4 to 8 carbon atoms,
vinyl pyridines having 7 to 20 carbon atoms,
vinyl pyrrolidones having 6 to 20 carbon atoms,
vinyl pyrroles having 6 to 20 carbon atoms,
vinyl pyrrolidines having 6 to 20 carbon atoms,
acrylamides having 3 to 20 carbon atoms,
aminoalkyl esters of acrylic acid and methacrylic acid having 4 to 20 carbon atoms
aminostyrenes having 10 to 20 carbon atoms.

5. The polymer of claim 2 wherein said polymer consists essentially of said repeat units A, B and/or C.

6. The polymer of claim 1 characterized by being a copolymer having in addition to the repeat units derived from pentadienyl chloride a substantial amount of further repeat units derived from one or more monomers selected from the group consisting of conjugated alkadienes having 4-12 carbon atoms per molecule,
vinyl substituted aromatic compounds having 8-20 carbon atoms per molecule,
ethylenically unsaturated nitriles having 3-8 carbon atoms per molecule,
esters of acrylic and methacrylic acid having 4-9 carbon atoms,
vinyl esters of aliphatic and aromatic acids having 3-8 carbon atoms,
vinyl ketones having 4 to 8 carbon atoms,
vinyl pyridines having 7 to 20 carbon atoms,
vinyl pyrrolidones having 6 to 20 carbon atoms,
vinyl pyrroles having 6 to 20 carbon atoms,
vinyl pyrrolidines having 6 to 20 carbon atoms,
acrylamides having 3 to 20 carbon atoms,
aminoalkyl esters of acrylic acid and methacrylic acid having 4 to 20 carbon atoms
aminostyrenes having 10 to 20 carbon atoms.

7. The polymer of claim 6 consisting essentially of said repeat units.

8. The polymer of claim 7 consisting essentially of pentadienyl chloride repeat units and further repeat units derived from one further monomer.

9. The polymer of claim 7 wherein said further repeat units are derived from 1,3-butadiene and a vinyl pyridine or 1,3-butadiene and styrene or 1,3-butadiene and acrylonitrile or ethyl acrylate.

10. The polymer of claim 9 wherein said vinyl pyridine is selected from the group of unsubstituted vinyl pyridine, methy vinyl pyridine and mixtures thereof.

11. A process to produce a polymer comprising
(a) subjecting a pentadienyl chloride monomer having the formula

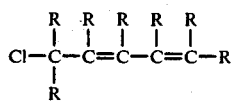

wherein R, which can be the same of different, represent hydrogen or alkyl radical with 1-15 carbon atoms per molecule,
to polymerization conditions, and
(b) recovering the polymer so produced.

12. Process in accordance with claim 11 wherein said pentadienyl chloride monomer is the only monomer subjected to polymerization conditions or wherein in addition to said pentadienyl chloride monomer one or more of the following monomers is copolymerized with the pentadienyl chloride monomer conjugated alkadienes having 4-12 carbon atoms per molecule,
vinyl substituted aromatic compounds having 8-20 carbon atoms per molecule,
ethylenically unsaturated nitriles having 3-8 carbon atoms per molecule,
esters of acrylic and methacrylic acid having 4-9 carbon atoms,
vinyl esters of aliphatic and aromatic acids having 3-8 carbon atoms,
vinyl ketones having 4 to 8 carbon atoms,
vinyl pyridines having 7 to 20 carbon atoms,
vinyl pyrrolidones having 6 to 20 carbon atoms,
vinyl pyrroles having 6 to 20 carbon atoms,
vinyl pyrrolidines having 6 to 20 carbon atoms,
acrylamides having 3 to 20 carbon atoms,
aminoalkyl esters of acrylic acid and methacrylic acid having 4 to 20 carbon atoms
aminostyrenes having 10 to 20 carbon atoms.

13. A curable composition comprising
(a) a polymer in accordance with claim 1,
(b) a modifying agent selected from the group consisting of curing agents, crosslinking agents and mixtures thereof in a quantity sufficient to change the properties of the polymer appreciably when said composition is subjected to conditions under which the modifying agent reacts with the polymer.

14. Process to produce shaped articles comprising
shaping a quantity of a composition in accordance with claim 13 essentially to the desired shape, and
subjecting the so shaped composition to curing or crosslinking conditions.

15. Process in accordance with claim 14 comprising introducing said quantity of a composition into a mold,
heating the so filled mold to the activation temperature of the modifying agent,
maintaining said temperature for the time necessary to modify said composition, and
removing the shaped article from the mold.

16. Process in accordance with claim 14 comprising extruding said quantity of a composition through a die.

17. Self-curing composition comprising
(a) a polymer component having a substantial amount of first repeat units being characterized by one of the formulae A, B and C

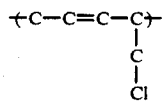 A

 B

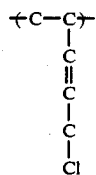 C wherein the remaining valences of the carbon atoms which are not connected to adjacent repeat units are connected to moieties which can be the same or different are selected from the group consisting of hydrogen and alkyl having 1-15 carbon atoms,
and a substantial amount of further repeat units containing a nitrogen atom capable of quaternization with the carbon-chlorine moiety of the first repeat units, and
(b) a solvent for this polymer.

18. A composition in accordance with claim 17 wherein said solvent is selected from the group consisting of pyridine, N,N-dimethylaniline, triethanolamine, dimethylaminoethyl methyl ether, triethylamine and tripropylamine.

19. Composition in accordance with claim 17 wherein said further repeat units are derived from monomers selected from the group consisting of
vinyl pyridines having 8 to 20 carbon atoms,
aminoalkyl esters of acrylic acid and methacrylic acid having 4 to 20 carbon atoms, and
aminostyrenes having 10 to 20 carbon atoms.

20. Composition in accordance with claim 17 wherein said polymer component further contains repeat units derived from one or more monomers selected from the group consisting of vinyl aromatic hyrocarbons having 8-20 carbon atoms and alkadienes having 4-8 carbon atoms.

21. Composition in accordance with claim 17 wherein said polymer component comprises a first polymer containing said first repeat units but being essentially free of said further repeat units and a second polymer containing said further repeat units but being essentially free of said first repeat units.

22. Adhesive composition comprising a composition in accordance with claim 17 and a tackifier resin.

23. Adhesive in accordance with claim 22 wherein the polymer component in said composition is a rubbery polymer.

* * * * *